Sept. 29, 1942.　　　　F. WENZEL　　　　2,297,445
CUTTING TOOL
Filed Sept. 8, 1939
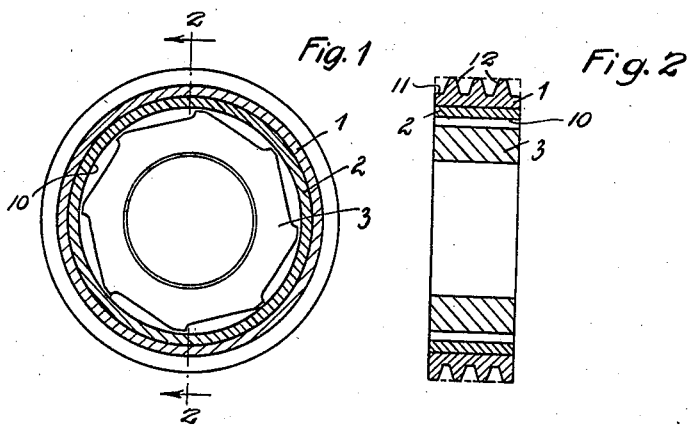
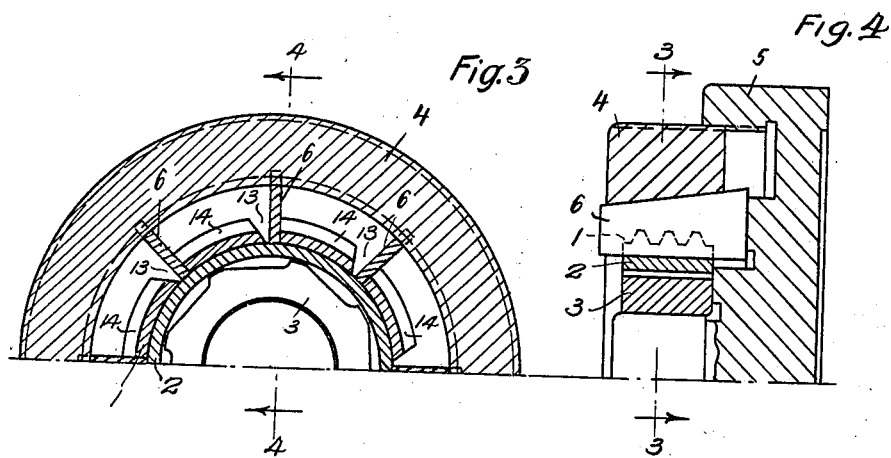
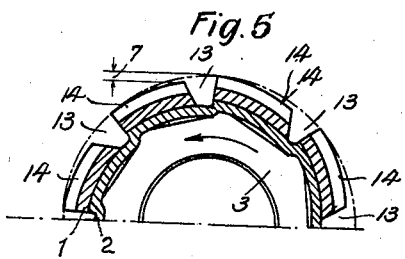
Inventor:
Friedrich Wenzel.

Patented Sept. 29, 1942

2,297,445

UNITED STATES PATENT OFFICE 2,297,445

CUTTING TOOL

Friedrich Wenzel, Berlin-Siemensstadt, Germany; vested in the Alien Property Custodian Application September 8, 1939, Serial No. 294,004
In Germany January 1, 1939

16 Claims. (Cl. 29—103)

This invention relates to cutting tools such as milling hobs, form cutters and the like. The cutters made in accordance with the invention are particularly useful in the manufacture of articles such as gears requiring highly accurate and efficient tools.

Cutters of this type are nowadays manufactured as relief ground cutters in the following manner:

The cutter body is first produced on a lathe and is then machined to produce the required grooves. The flanks of the teeth are then produced in a further operation by relieving the individual teeth. The cutter is next heat-treated to relieve material stresses and is subsequently hardened and tempered. The bore is finished by grinding and lapping operations, and another operation provides for the sharpening of the faces of the teeth. Certain types of cutters require relief grinding as an additional step. This operation is performed on special machines and is effected according to the type, size and pitch of the cutter teeth by means of double-cone, hollow-conical or point grinding wheels. The last mentioned grinding wheels for performing the relief grinding operation are expensive, subject to wear, easily damaged and their proper use requires skilled labor.

The exacting requirements intimated above and other requirements well known to the art, which are now indispensable in the manufacture of certain gears, introduce drawbacks which are avoided by the use of cutting tools made according to the invention.

The new cutter may be produced by the following steps.

1. The provision of a concentric composite ring structure comprising a ring made of a soft metal, copper or soft iron, for instance, and another ring made of a hard metal, e. g., tool steel attached to the first mentioned ring by welding or soldering or the like. The first mentioned ring of soft metal may be termed the "carrier member" or "carrier ring," and the other ring may be designated as "tool ring."

2. A polygonal member is driven or pressed into concentric engagement with the carrier ring noted above, forming with the composite rings a uniform, accurately centered structure.

3. This structure is put on a spindle or mandrel, or on another suitable tool, and the profile and flanks of the cutting teeth are cut or ground from and into the material of the tool ring which is made of hard metal.

4. Axial grooves, which may be termed "tension grooves," are then cut or ground into the tool ring to a depth reaching the carrier ring, thus producing on the soft carrier ring individual axially or longitudinally extending teeth of hard metal.

5. The profile of the individual teeth segments may then be treated by lapping or the like, to produce a smooth crack-free surface.

6. The resulting structure is put into a suitable device, for example, in a press, and wedges or wedge-like members are driven into the tension grooves, exerting a radial pressure for the purpose of deforming the carrier ring radially, that is, pressing the soft material of the carrier ring into the spaces of the polygonal member. This step disposes the individual teeth at an angle determined by the form of the polygon and secures the carrier ring in firm interlocking engagement with the polygon.

7. Finishing operations, such as sharpening, and finally, lapping and smoothing the individual teeth of the tool, may be applied if desired or necessary.

The invention will be better understood from a detailed description rendered below with reference to the drawing. In the drawing, Fig. 1 shows a section through the initial composite ring structure comprising, in this embodiment, a centrally disposed polygonal member, an inner carrier ring disposed on the polygon, and an outer tool ring of hardenable metal attached to the carrier;

Fig. 2 is a section through the structure shown in Fig. 1, along the line 2—2, also indicating the step of providing the proper profile and the flanks for the cutting teeth of the tool;

Figs. 3 and 4 represent sections through a device for performing the step of pressing sections of the soft carrier ring into corresponding depressed spaces on the centrally disposed polygonal member; and Fig. 5 is a partial section through the finished tool.

Referring now to the drawing, showing one embodiment of the invention, numeral I indicates the ring made of tool steel or hardenable metal. Within this ring is disposed the carrier ring 2 which may be made of copper or soft iron. These rings are joined by hard solder or by welding or the like. The tool ring I is suitably tempered or hardened. This constitutes the first step in the process of producing the tool, resulting in a concentric composite double ring, the outside ring I of which is hard and the inside or carrier ring 2 of which is made of soft material.

The boring 10 of the copper ring (carrier ring) is suitably machined, for example, on a turning lathe, so as to provide the proper inside diameter. A polygonal member 3, shown in Figs. 1 and 2 in plan view and in section, respectively, is driven or pressed into position within the boring 10 of the carrier ring 3 so as to assume the central centered position shown. The body then resulting, in this embodiment, comprises the following parts, listing these parts from the inside to the outside: (1) a steel polygon having a central boring; (2) a soft carrier ring made of copper or soft iron or the like; and (3) a hard outer ring of tempered or hardened tool steel or similar suitable material.

This body is placed on a suitable spindle or mandrel for the purpose of grinding on the outer tool ring the required lateral surfaces 11 and the sides or flanks 12 (Fig. 2) of the profile of the tool. Grinding wheels having relatively large diameters, that is, for example, fast rotating grinding wheels, may readily be used for performing the required operation since a relief grinding is not effected. Such grinding wheels are relatively cheap, and the grinding is carried out with the desired accuracy even in the case of profiles with the smallest module. The resulting surfaces of the profile are accurately centered with respect to the central boring of the tool.

If very smooth surfaces are desired in the tool structures to be produced, for example, if the tool is intended for the manufacture of small gear wheels for precision apparatus, the surfaces may be polished by lapping so as to produce the required surface finish. It may be stated that the smoothness of the surfaces which can be produced according to the present method could not be obtained even approximately by employing previously known processes.

The next step has to do with forming the individual teeth in the cutter. Axial grooves 13 are cut or ground for this purpose in the outer steel or tool ring 1, to form individual hard segments forming the teeth 14 which are thus carried by and disposed on the soft carrier ring 2. The grinding of these grooves is carried radially down to the supporting carrier ring 2 at places corresponding to and radially substantially in line with or near the deepest points of the depressions formed on the periphery of the polygon 3.

If desired, the individual teeth segments may be treated, for example, by lapping, so as to remove all cracks or surface grooves or blemishes. The teeth segments may thus be made microscopically smooth.

The resulting body is then placed into a device designed for exerting radial pressure on the soft carrier ring in the places determined by the tension grooves 13 so as to press the ring radially into engagement with the corresponding depressions in the polygon 3. This operation completes the process except for finishing steps that may be applied, and pitches the teeth radially at an angle as indicated at 7 in Fig. 5.

The device, in the embodiment shown in the drawings, comprises a ring 4 which is gradually drawn in axial direction into a ring 5, for example, by means of a screw spindle or by any other suitable means that may include a sturdy press. Wedges 6 project radially inwardly from the ring 4, as shown in Fig. 3, or are disposed as shown in this figure. These wedges are driven within the tension grooves 13 radially against the soft carrier ring 2, and thus deform and press the ring at the indicated points into the peripheral depressions on the polygon 3.

The form of the soft carrier ring after this operation and the resulting form and angle of the teeth 14 is apparent from Fig. 5. The material easily withstands the deformation and the proper angle of relief may thus be obtained with an accuracy and certainty that was unobtainable in the past. The teeth of the tool are by this operation also firmly interlocked with the centrally disposed polygon.

The face of the teeth may now be sharpened and finally lapped, and the tool is ready for use.

Time may be saved in the process of producing this novel tool by certain preparatory steps or refinements that may be easily carried out. For example, the profile or tool ring may be milled or lathed before being attached to the support or carrier ring 2, and then properly hardened, as described before.

The device shown in Figs. 3 and 4 for effecting the step of pressing the soft carrier ring 2 into interlocking engagement with the polygon, and thus for pitching the teeth at the proper angle, may be constructed differently according to the particular tool which is to be produced, or for any other considerations, so long as the intended object is achieved.

The invention presents the following great advantages:

The time required in carrying out the different operations involved in the manufacture of milling hobs and form cutters is considerably reduced. The time necessary for grinding the profile amounts to a few minutes as compared to the several hours required in relief grinding cutters according to the known method.

The surfaces of the flanks of the cutter teeth and therefore also the surfaces of the toothed wheels or profiles produced are considerably smoother than the surfaces of the teeth which can be cut out with the best ground cutters.

The number of teeth of the cutters may be increased approximately by 25%, so that a particularly smooth surface of the flanks of the teeth may be obtained which is above all very important when cutting a small number of teeth.

Cutters with the smallest module, for instance, 0.1 may also be ground. The teeth produced with the aid of these small cutters present a very smooth surface finish, as may be detected by the microscopic method and careful measurements with the gears in operation.

The cost of a cutter manufactured according to the method of the invention is 50% lower than that of a cutter with relief ground flanks. This considerable reduction in cost is due to the saving in expensive high-grade tool steels as well as to the considerably shorter time required in the manufacture of the cutters.

The cutters produced in accordance with the invention may be employed for all kinds of gearing and profiling work. Spur and spiral gears and profiles of any shape may be manufactured with such an accuracy as to ensure a complete interchangeability of the toothed bodies produced. The greater number of teeth of the cutter permits a greater feed as well as higher cutting speeds and therefore an increase in output while at the same time the smooth surface finish of the teeth is improved. The steps outlined herein may also be employed in the manufacture of taps and cutting dies.

Changes may be made within the scope and spirit of the accompanying claims.

What is claimed is:

1. A cutting tool of the class described, comprising a plurality of individual cutting teeth, a carrier member for said teeth disposed in radial alignment therewith for holding said teeth in permanent fixed position, and a polygonal member disposed in radial alignment with said carrier member and in radially interlocking permanent engagement therewith.

2. The tool defined in claim 1, wherein said carrier member is made of relatively soft metal and is radially deformed to engage with surface depressions on said polygonal member.

3. The tool defined in claim 1, wherein said carrier member is radially deformed to engage depressions on said polygonal member, the deformations of said carrier member determining the angular position of said cutting teeth.

4. The tool defined in claim 1, wherein said carrier member is radially deformed at places radially substantially in line with the rear end of said cutting teeth to determine the angle thereof and to effect the interlocking engagement of said carrier member with said polygonal member.

5. A cutting tool, comprising a circumferentially polygonal member provided with a central boring, a carrier ring of relatively soft substantially non-hardenable metal on said member, said carrier ring being radially deformed to effect interlocking engagement with surface depressions of said polygonal member, and cutting teeth carried by and attached to said carrier ring.

6. A cutting tool, comprising a circumferentially polygonal member provided with a central boring, a carrier ring of relatively soft substantially non-hardenable metal on said member, said carrier ring being radially deformed to effect interlocking engagement with the surface of said polygonal member, and cutting teeth carried by and attached to said carrier ring, the deformation of said carrier ring substantially determining the angle of said cutting teeth.

7. The tool defined in claim 6, wherein said cutting teeth are firmly and normally non-removably attached to said carrier ring.

8. As an article of manufacture, a unitary cutting tool composed of the following parts which normally form an integral fixedly assembled unit, namely, an inner centrally apertured circumferentially polygonal member, a carrier member made of relatively soft substantially non-hardenable metal fixedly and normally non-removably attached to the outside thereof and in interlocking relation therewith, and cutting teeth on said carrier member made of tool steel or the like.

9. The article defined in claim 8, wherein said cutting teeth are firmly attached to said carrier member.

10. The article defined in claim 8, wherein said cutting teeth are firmly attached to said carrier member, and wherein said carrier member is mechanically deformed to effect the attachment thereof with said polygonal member.

11. A unitary cutting tool, made of a plurality of parts forming an integral normally fixedly assembled unit consisting of a plurality of fixed cutter teeth, a single carrier member for firmly holding said teeth disposed in back thereof, and a single mounting member for firmly holding said carrier member disposed in back of said carrier member.

12. A unitary cutting tool made of a plurality of parts forming an integral normally fixedly assembled unit consisting of a plurality of cutter teeth, a single carrier member for firmly holding said teeth disposed in back thereof in radial alignment therewith, a single mounting member disposed in back of said carrier member in radial alignment therewith, and means on said mounting member for firmly holding said carrier member with the cutting teeth thereon disposed at an angle.

13. In a cutting tool of the class described, a mounting member, an angularly inclined unbroken surface on said mounting member, a separate carrier member fixedly and normally non-removably attached to said surface, and a cutting tooth fixedly and normally non-removably attached to said carrier member and forming a unitary fixed and integral operating structure with said carrier member and said mounting member.

14. In a cutting tool of the class described, a mounting member, an angularly inclined unbroken surface on said mounting member, a separate carrier member fixedly and normally non-removably attached to said surface, and a cutting tooth fixedly and normally non-removably attached to said carrier member at an angle determined by the angle of the inclined surface on said mounting member and forming a unitary fixed and integral operating structure with said carrier member and said mounting member.

15. The tool structure defined in claim 14, wherein said cutting tooth is made of steel and said carrier member of non-hardenable metal.

16. A milling cutter comprising a centrally disposed mounting member, circumferentially uniformly disposed angularly extending depressions on said mounting member, a ring of relatively soft metal shrunk on said mounting member to engage said depression in interlocking engagement therewith, and cutting teeth of hardenable metal attached to said ring.

FRIEDRICH WENZEL.